United States Patent [19]
Lowther

[11] 3,899,683
[45] *Aug. 12, 1975

[54] DIELECTRIC LIQUID-IMMERSED CORONA GENERATOR

[75] Inventor: Frank E. Lowther, Severna Park, Md.

[73] Assignee: Purification Sciences Inc., Geneva, N.Y.

[ * ] Notice: The portion of the term of this patent subsequent to Sept. 17, 1991, has been disclaimed.

[22] Filed: Oct. 26, 1973

[21] Appl. No.: 409,802

Related U.S. Application Data

[60] Division of Ser. No. 281,451, Aug. 17, 1973, Pat. No. 3,836,786, which is a continuation-in-part of Ser. No. 141,148, May 7, 1971, which is a continuation-in-part of Ser. No. 709,485, Feb. 29, 1968, abandoned, which is a continuation-in-part of Ser. No. 612,751, Jan. 4, 1967, abandoned, said Ser. No. 281,451, is a continuation-in-part of Ser. No. 830,248, June 4, 1969, Pat. No. 3,798,457.

[52] U.S. Cl. ............... 250/532; 204/176; 250/541
[51] Int. Cl.[2] ..................................... C01B 13/12
[58] Field of Search ..................... 250/530–542; 204/176

[56] References Cited
UNITED STATES PATENTS

| | | |
|---|---|---|
| 1,403,759 | 1/1922 | Fitzpatrick .................... 250/541 |
| 1,539,419 | 5/1925 | Keiser .............................. 250/532 |
| 3,542,664 | 11/1972 | Guillerd et al. ................ 250/541 |
| 3,622,492 | 11/1971 | Kinney ............................ 250/541 |
| 3,836,786 | 9/1974 | Lowther .......................... 250/540 |

FOREIGN PATENTS OR APPLICATIONS

824,238 11/1959 United Kingdom ............... 250/532

*Primary Examiner*—John H. Mack
*Assistant Examiner*—Aaron Weisstuch
*Attorney, Agent, or Firm*—Schovee & Boston

[57] ABSTRACT

A plurality of air-tight corona generating cells of a corona generator are supported in a liquid-tight housing where they are immersed in a dielectric liquid such as transformer oil for preventing arcing between the edges of the two electrodes of each corona generating cell. The dielectric liquid is in heat exchange relationship with the external surface of each electrode and is circulated between a cooler and the housing for cooling the electrodes. A center support disc located between the electrodes of a cell unexpectedly increases the ozone yield.

16 Claims, 25 Drawing Figures

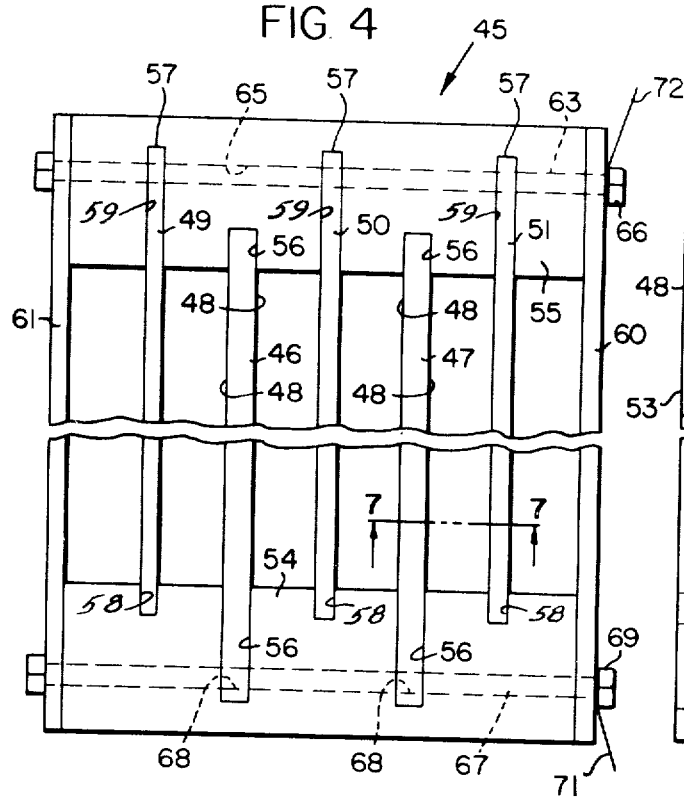
FIG. 4
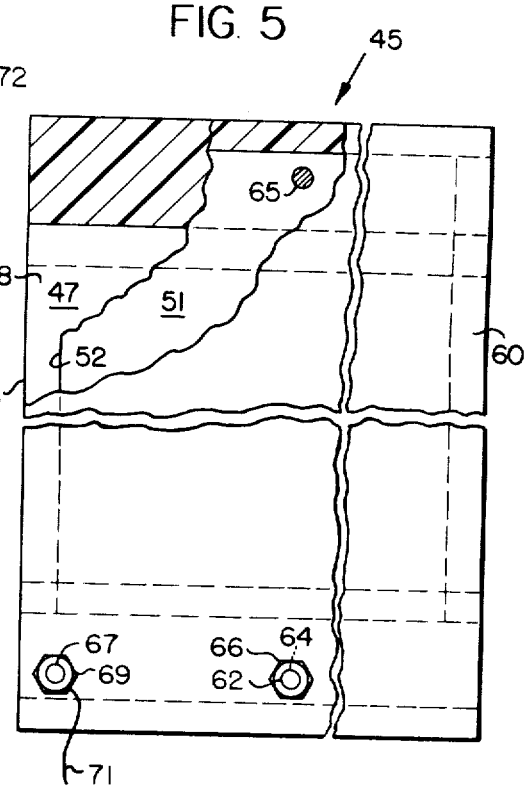
FIG. 5
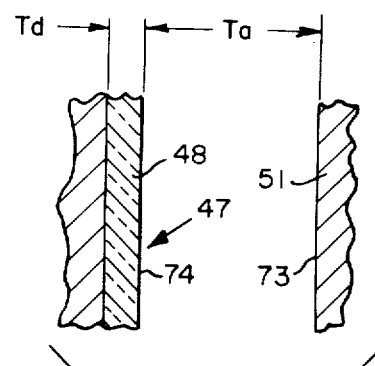
FIG. 7
FIG. 6

DIELECTRIC LIQUID-IMMERSED CORONA GENERATOR

CROSS-REFERENCE TO RELATED APPLICATIONS

This is a division of application Ser. No. 281,451, filed 8-17-73 now U.S. Pat. No. 3,836,786, which was a continuation-in-part of my copending application Ser. No. 141,148, filed May 7, 1971, which was in turn a continuation-in-part of my application Ser. No. 709,485, filed Feb. 29, 1968, and now abandoned, which was in turn a continuation-in-part of my application Ser. No. 612,751, filed Jan. 4, 1967, and now abandoned. Application Ser. No. 281,451 is also a continuation-in-part of my copending U.S. application Ser. No. 830,248, filed June 4, 1969, now U.S. 3,798,457.

BACKGROUND OF THE INVENTION

1. Field of the Invention

This invention relates to corona generators and in particular to commercial large scale ozone generators.

2. Description of the Prior Art

Present commercial ozone generators (as distinguished from very small and inefficient generators capable of producing less than one pound of ozone a day) are used primarily in certain chemical processes and other applications requiring a high degree of sterilization, unobtainable by the use of well-known chemical oxidants or disinfectants. Although beneficial in many other major applications, such as treatment of industrial waste water or sewage, for example, commercial ozone generators are not used extensively, because the ozone is produced in a highly diluted form by equipment that is costly, bulky, complicated, and expensive to operate. According to the accepted and usual practice in commercial ozone generators, the corona discharge for producing ozone is generated by applying a voltage in the order of from ten thousand to twenty thousand volts across a glass tube, having walls approximately 100 mils thick, with a conductive coating on the inside, and a metallic conductor adjacent the tube's outside surface. In such apparatus, operating at fifteen thousand volts, for example, the actual ozone output is in the order of less than 2 ounces per day per square foot of generating area under normal atmospheric conditions. Further, such bulky apparatus requires water cooling and thousands of gallons of water must be pumped through the apparatus daily. Attempts have been made to make commercial ozone generators employing, for example, mica, oil paper, plastic, glass, and rubber dielectrics, either as separate sheets or coated onto an electrode by immersion or painting, but all such attempts have failed because, for example, either a high voltage application was required to obtain even minimal amounts of ozone, or there were limitations in the configurations that the generating devices could assume, or the dielectric would burn through after a limited number of hours of operation.

It is an object of the present invention to provide a new corona generator method and apparatus that overcomes the problems of previous corona generators, and that produces large amounts of high concentration ozone at relatively low voltages. The present invention employs a thin, hard porcelain enamel dielectric coating free of bubbles and free of conductive particles, and the dielectric thickness is minimized and the dielectric constant is maximized to produce an unexpected substantial increase in useful corona power per unit of dielectric area, and thus a corresponding increase in ozone yield. For example, for a given dielectric constant and voltage a 5 mil dielectric produces 8 times as much ozone as a 40 mil dielectric, and twenty times as much as the usual one hundred mil dielectric, operated according to the previous method. Also, for a given voltage, a five mil dielectric with a dielectric constant of one hundred, for example, produces four hundred times more ozone than a conventional 100 mil glass dielectric for a given dielectric surface area. Additionally, by using a fired-on porcelain enamel dielectric coating with a high temperature softening point, a reliable, long lasting assembly is provided, and at the same time, the ozone output per unit of dielectric generating area is substantially increased for a given voltage.

A further object of the present invention is to provide an improved corona generator for producing ozone, that is inexpensive, durable, rugged and relatively simple to manufacture.

SUMMARY OF THE INVENTION

A corona generator including a plurality of air-tight corona generator cells, each cell including a pair of parallel, spaced-apart, electrodes each having a thin, hard, fired-on porcelain enamel coating having a high softening point temperature. The corona power and thus the ozone yield are maximized by maximizing the expression $(\epsilon/T_d)$ where epsilon is the dielectric constant and $T_d$ is the dielectric thickness, such that (with $T_d$ in mils) the expression $(\epsilon/T_d)$ is greater than 0.10. Oxygen containing gas (for example, air or oxygen) is passed between the electrodes, spaced a predetermined optimum distance apart, and the electrodes are connected to an AC voltage source having a frequency of between about 60 Hz and 40 KHz and having a voltage of between about, the corona start voltage and 15,000 volts. The generator is cooled, and edge sparking between the electrode edges of each cell is prevented, by immersing the cells in a dielectric liquid with the external surface of the electrodes in heat exchange relationship with dielectric liquid. The combined total dielectric thickness $(T_d)$ for the two coatings for each cell is preferably less than about 40 mils and is preferably about 18 mils, and the air gap $T_a$ is preferably in the range of 5–100 mils. The length of the air gap is predetermined in accordance with the thickness of the dielectric, the relative dielectric constant, the gas pressure, and the magnitude of the applied voltage. The hermetically sealed cells can be operated at a pressure higher or lower than ambient, for example, the cells can be operated at any pressure in the range of from at least about 0 to 30 psia. A center support disc is located between the electrodes of each cell to help maintain the thin electrodes parallel and flat and to make the gas flow through the cell uniform.

BRIEF DESCRIPTION OF THE DRAWINGS

The present invention will be more fully understood by reference to the following detailed description thereof, when read in conjunction with the attached drawings, wherein like reference numerals refer to like elements, and wherein;

FIG. 4 is an enlarged end elevation of a corona generator assembly, according to another embodiment of the present invention;

FIG. 5 is an enlarged side elevation, partly cut away, of the embodiment shown in FIG. 4;

FIG. 6 is a plan view of the embodiment shown in FIGS. 4 and 5;

FIG. 7 is a greatly enlarged cross sectional view of the generating members illustrating certain of the parameters according to the present invention;

DETAILED DESCRIPTION OF THE PREFERRED EMBODIMENTS

Figure 23:
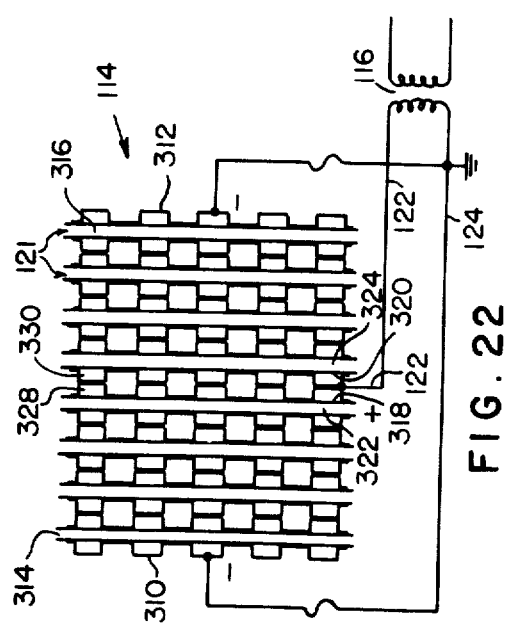
FIG. 23 is an electrical schematic circuit diagram showing the individual corona reactor cells connected in parallel.
Figure 24:
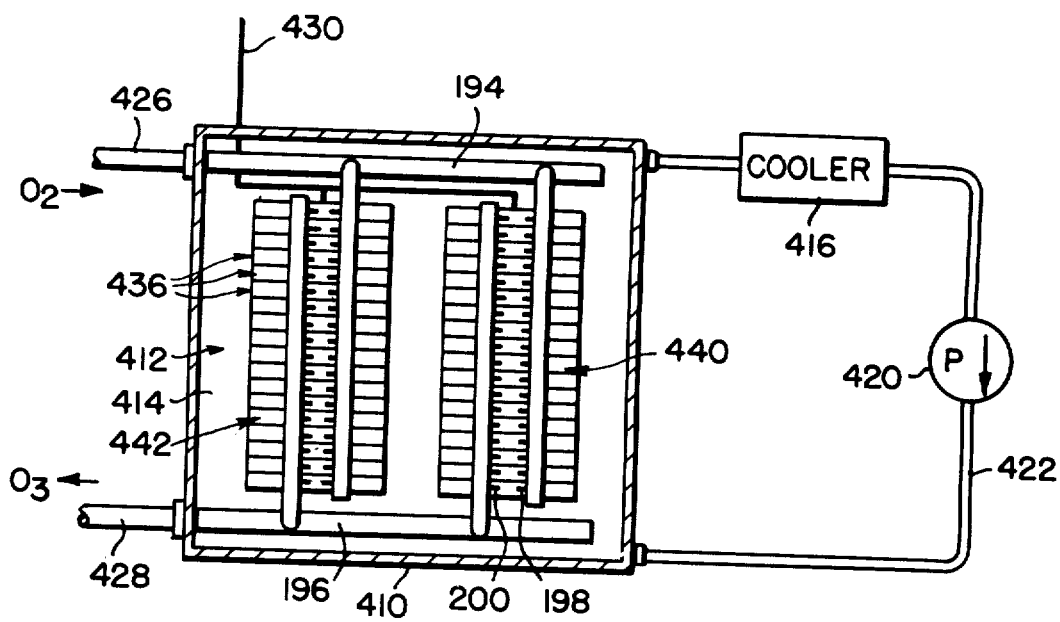
FIG. 24 is a partly schematic plan view showing the dielectric liquid-immersed corona generator system of the present invention.
Figure 25:
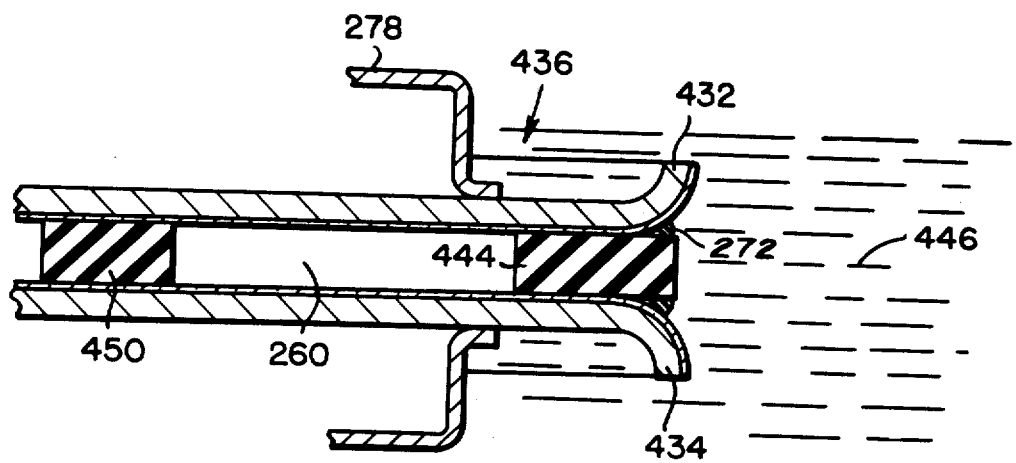
FIG. 25 is a partial cross-sectional view through one end of an immersed corona generator cell, also showing the center support disc of the present invention.

The present invention is in the dielectric liquid-immersed corona generator shown specifically in FIGS. 24 and 25, and also in the center support disc shown in FIG. 25. However, the present invention is a modification of, and employs the methods and apparatuses described below and shown in FIGS. 1–23; thus, to fully understand the present invention, reference will first be made to FIGS. 1–23.

Figure 1:
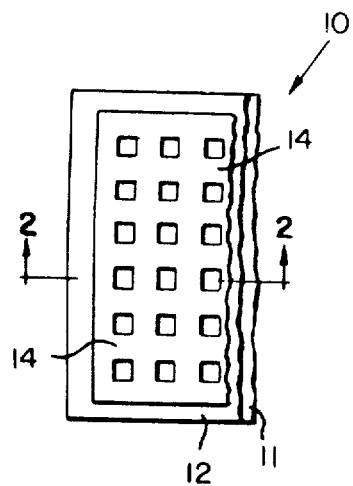
FIG. 1 is a fragmentary, plan view of a corona generator according to one embodiment of this invention.
Figure 2:
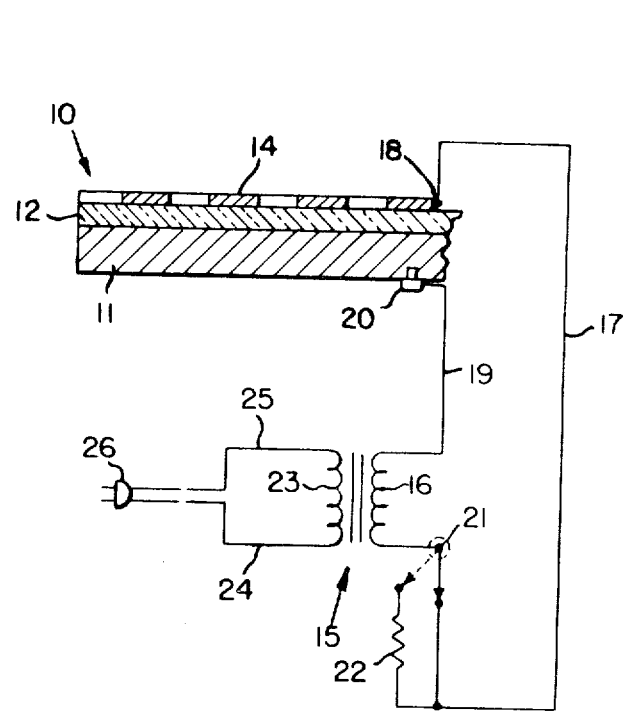
FIG. 2 is an enlarged, cross-sectional view taken at line 2—2 of FIG. 1 and illustrating schematically typical circuitry to create the corona.

Referring in detail to FIGS. 1 and 2, reference numeral 10 refers generally to a corona generator assembly that includes a flat piece of metal 11, which may be any type, such as iron, steel, copper, or an alloy, for example. Decarbonized steel, or stainless steel, however, is preferable because there is less tendency for carbon particles to spall during firing and become embedded in the coating. The metallic piece 11 is coated with one or more thin, hard layers of porcelain enamel 12. In applying the coating, the metallic piece is first pickled in any well-known manner, or in the case of stainless steel sandblasted. The etched metal piece 11 is then sprayed with porcelain enamel, and fired at approximately 1500° Fahrenheit to harden and bond or fuse the porcelain 12 to the surface of the metal 11.

Porcelain enamel is preferable in that it is inexpensive to apply in a thin uniform layer; and it has a relative dielectric constant in the neighborhood of from 5 to 10. Other dielectric materials having a softening point equal to glass or above, could be employed, if they could be fabricated or coated in a uniform layer that is thin enough to obtain the benefits of the teachings of this invention, which will be discussed hereafter.

Deposited, by any well-known method, on the surface of the porcelain enamel 12 is a metallic grid 14 adjacent which the corona or silent electrical discharge occurs. This metallic grid may be a conductive paint, for example, that is applied to the porcelain surface.

A transformer 15 has a secondary winding 16 which is connected by its wire 17 to the metallic grid 14 at connector 18, which may be a soldered joint, for example. The winding 16 is also connected by its wire 19 to the piece of metal 11 by any conventional connector illustrated at 20. A two position switch 21 may be used to selectively connect resistor 22 in the circuit of the secondary winding 16 to reduce the power of the electrical discharge, and thus the rate of ozone generation, for odor control application in limited areas. A primary winding 23 of the transformer 15 is adapted to be connected to ordinary 110 volt AC current by plus 26.

Figure 3:
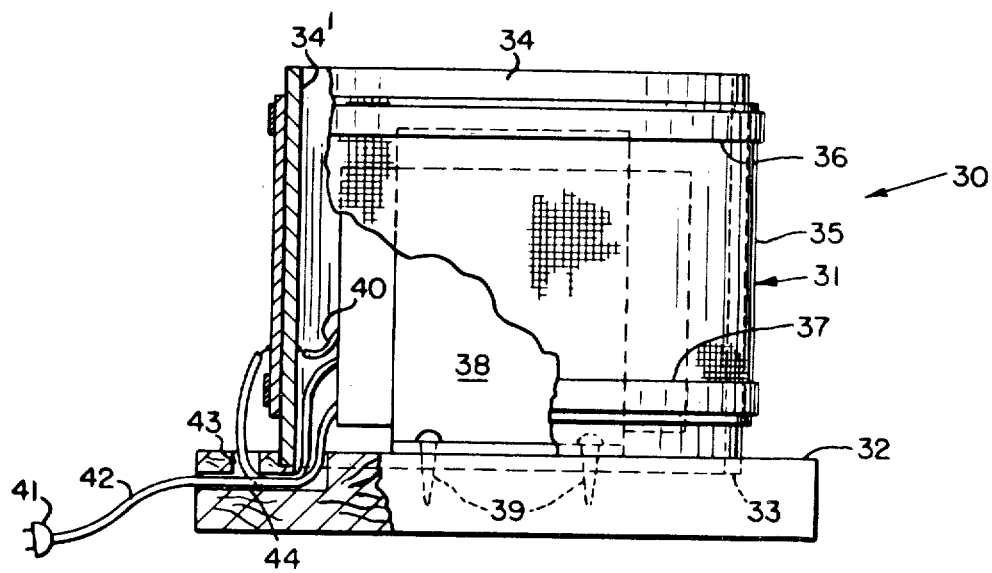
FIG. 3 is a view in perspective, partly cut away, illustrating another type of generator, according to the present invention.

Referring to FIG. 3, reference numeral 30 refers generally to a corona generator for producing ozone, employing a cylindrical electrode structure 31. The generator 30 has a base 32, which may be of any suitable material such as wood or plastic. The base 32 has a circular groove 33 to receive one end of the structure 31 for holding it in position relative to the base 32. The structure 31 has a fired-on porcelain enamel coating 34 on a metallic cylinder 34', as discussed in connection with the coating 12 of FIG. 1. In intimate contact with the coating 34 is a metallic screen 35 that is fastened securely by metallic bonds 36 and 37. A transformer 38 is positioned inside the structure 31 and fastened to the base 32 by screws 39. The secondary winding of transformer 38 is shown connected to cylinder 34' and screen 35 by wires 40. The primary winding is adapted to be connected to a conventional voltage source by plug 41 connected to wire 42. Wires 40 and 42 may extend externally of the cylinder through slots 43 and 44 in the base 32. A perforated cover (not shown) may be placed over the dielectric-conductor structure 31 for protection.

Referring to FIGS. 4 through 6, reference numeral 45 designates generally a corona generating assembly according to another embodiment. The assembly 45 comprises rectangular sheet metal conductive members 46 and 47, both sides of which have a thin, hard coating of fired-on porcelain enamel 48 as described in connection with the previous embodiment Mounted parallel and spaced from the plates 46 and 47 are flat, metal conductive members 49, 50, and 51. As used in the present specification and claims, the term "parallel" as applied to the electrodes is not limited to flat electrodes, but also includes cylindrical, uniformly spaced-apart electrodes as shown in FIG. 3. The flat plates 49, 50, and 51 are rectangular and have an area of smaller dimensions than the coated plates 46 and 47, to prevent arcing between front and rear edges 52 of plates 49, 50, and 51, and corresponding front and rear adjacent edges 53 of coated members 46 and 47. The plates 49, 50, and 51 are positioned so that their smaller dimension is parallel to the air flow to present a larger frontal area. Retaining members 54 and 55, which may be of a suitable insulating material, such a polyvinylchloride, for example, hold the coated members 46 and 47, and the conductors 49, 50, and 51 in parallel spaced relation to each other a predetermined distance. One end of coated members 46 and 47 fits in slots 56 of plastic member 55. One end of the plates 49, 50 and 51 fits in slots 58 of the plastic retaining member 54, and the other end of the plates 49, 50, and 51 fits in slots 59 of the plastic retaining member 55. Plastic end plates 60 and 61 hold the members 54 and 55 together by steel pins 62 and 63 which extend through bores 64 and 65 of the members 54 and 55. The steel pin 63 fits in holes in plates 49, 50, and 51 that align with the slots 59 when mounted in the member 55.

The holes in the plates 49, 50, and 51 are slightly smaller than the pin 63 so that when the pin 63 is inserted, it tightly engages the plates 49, 50, and 51 to connect them together electrically. The pin 63 may be threaded at the ends to receive nuts 66 to complete the assembly. A steel pin 67 extends through holes 68 adjacent the corners of the coated plates 46 and 47. The pin 67 is of such diameter that it snugly engages the metal portion of the coated plates adjacent the periphery of the holes 68 to connect them together electrically.

One terminal of a transformer 70 is connected by a wire 71 to pin 67. The other terminal of the transformer 70 is connected by wire 72 to nut 66. Upon application of the voltage from the transformer 70 to a corona is generated between one surface of the coated plate 46 and the opposing surface of conductive member 49, and between the other side of the coated plate 46 and the opposing surface of the conductive member 50. Similarly, a corona is also generated on both sides of the coated plate 47 between opposing surfaces of the conductors 50 and 51.

Referring to FIG. 7, the coated plate 47 illustrates a fired-on porcelain dielectric coating having a thickness referred to as Td. The conductive or metal plate 51 has a surface 73 spaced a distance Ta from the porcelain surface 74. The importance of these parameters will be discussed hereinafter. Also, in connection with the description, it is assumed that the applied voltage is 60 cycle AC voltage.

To understand the principles of the present invention, it must first be noted that according to authoritative sources, the basic thermo-chemical equation with respect to the formation of ozone is as follows:

$$3O_2 \text{ \& } 68,200 \text{ calories} \rightleftarrows 2O_3$$

By converting calories to watt hours of electrical energy, the theoretical yield of ozone that can be reached at one hundred per cent efficiency is 0.376 kilowatt hours for each pound of ozone generated. The amount of useful corona power for generating a corona in terms of the minimum voltage at which a corona can be generated is represented by the following formula:

$$P = 4 F V_s C_g (V_o - V_{cs})$$

where
P = corona power in watts
F = frequency in cycles per second
$V_s$ = sparking voltage for a given air gap and air pressure
$V_o$ = applied peak voltage
$V_{cs}$ = corona start voltage
$C_g$ = dielectric capacitance in Farads According to the teachings of the present invention, the dielectric capacitance is converted to terms of thickness of the dielectric, dielectric constant, and the corona generating area according to the following formula or equation:

$$C_g = 0.225 \times 10^{-9} \epsilon \frac{A}{T_d}$$

where
$\epsilon$ = relative dielectric constant
Td = dielectric thickness in mils
A = corona generating area in square inches The corona start voltage $V_{cs}$ is a function of the sparkling voltage $V_s$ according to the following equation:

$$V_{cs} = \frac{(C_a + C_g)}{C_g} V_s$$

where
$C_a$ = the capacitance of the air gap in Farads.

To convert the corona start voltage $V_{cs}$ to sparking voltage $V_s$, the following formula is used:

$$C_a = 0.225 \times 10^{-9} \frac{A}{T_a}$$

where
$T_a$ = the length of the air gap in mils

From the foregoing, at 60 cycle AC applied voltage, the useful corona power may be expressed as follows:

$$\frac{P}{A} = 0.54 \times 10^{-7} \left(-\frac{V_s}{T_a}\right) \left\{ V_o - \left(\frac{T_d + \epsilon T_a}{\epsilon T_a}\right) V_s \right\}$$

According to the principles of the present invention, by recognizing that at standard atmospheric conditions, the sparking voltage is expressed as related to the air gap length as follows:

$$\frac{V_s}{T_a} = 100 \text{ (volts per mil of air gap length)}$$

Therefore, we obtain the following formula for useful corona power in watts per unit of corona generating area in terms of dielectric thickness and dielectric constant and length of air gap in mils.

(1) $\quad \frac{P}{A} = 0.54 \times 10^{-5} \left(\frac{T_a}{T_d}\right) \left\{ V_o - \frac{100}{\epsilon}(T_d + \epsilon T_a) \right\}$ To further understand the principles of the invention, the air gap $T_a$ for giving the maximum useful corona power, may be calculated by differentiating the equation (1) above, with respect to the air gap and equating to zero as follows:

(2) $\quad (T_a) \text{ optimum} = \frac{V_o}{200} - \frac{T_d}{2\epsilon}$ where $(T_a)$ optimum = the length of air gap in mils for the maximum useful corona power per unit of dielectric generating area.

To determine this maximum corona power at the optimum air gap, the equations (1) and (2) are combined to obtain the following $$\frac{P}{A} \text{optimum} = 0.135 \times 10^{-7} \frac{(\epsilon)}{(T_d)} \left\{ V_o - \frac{100 T_d}{\epsilon} \right\}^2$$

In discussing the operation of the present invention, reference will be made to FIG. 7 and to the graphical illustration of FIGS. 8 through 12 inclusive. The symbols in FIG. 7 and the graphical illustrations are identical to the symbols used in the foregoing equations.

Figure 8:
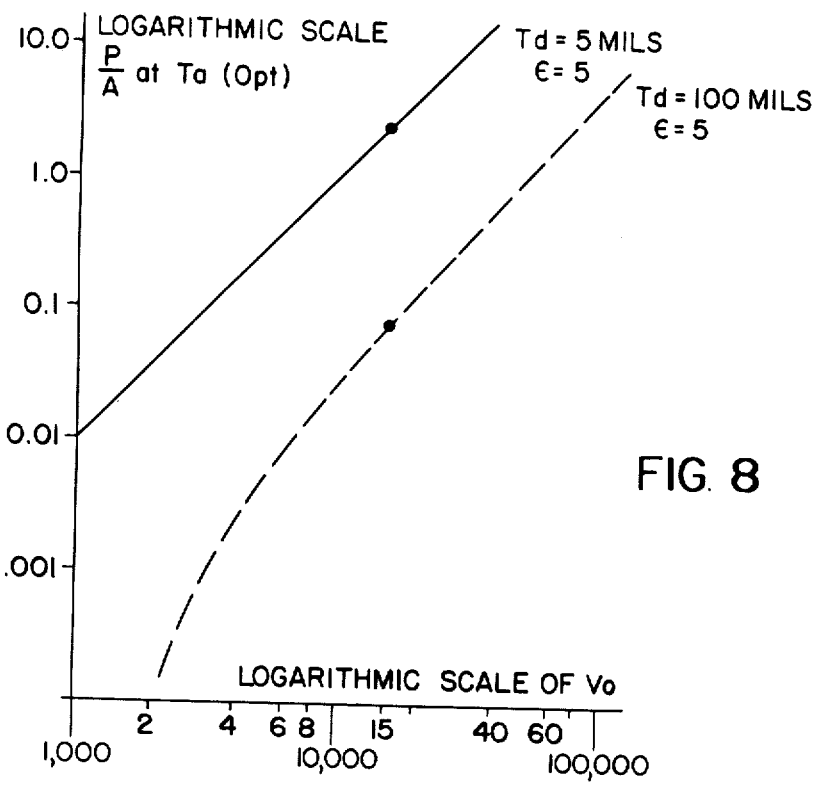
FIG. 8 is a graphical illustration of the useful corona power in watts per square inch as a function of voltage and dielectric thickness according to the principles of the present invention.
Figure 9:
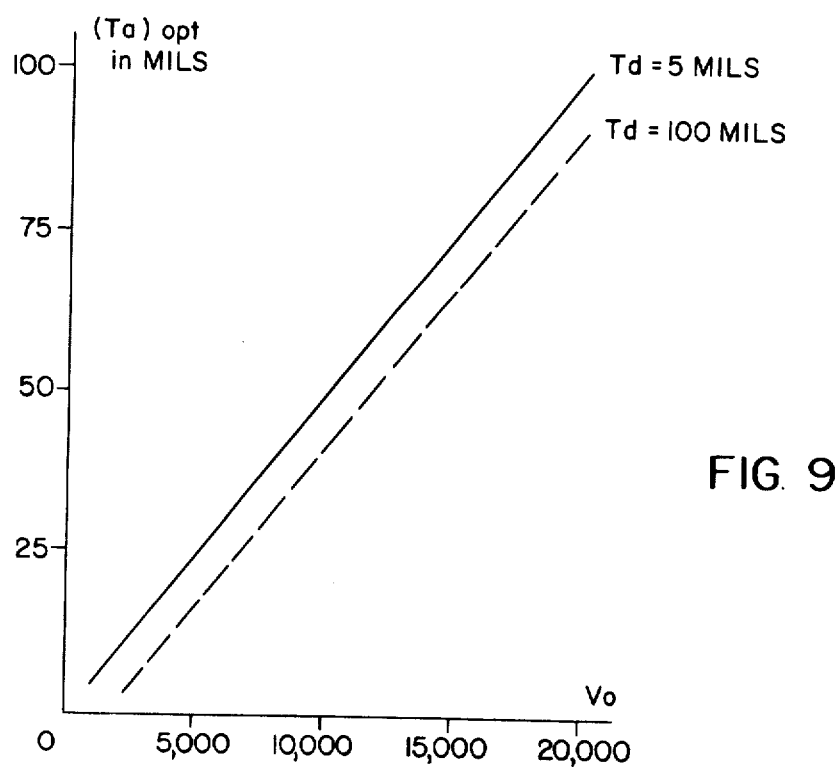
FIG. 9 is a graphical illustration of the optimum air gap as a function of voltage and dielectric thickness according to the principles of the present invention.

Referring to FIG. 8, the dashed line represents a conventional one hundred mil thick dielectric now utilized in corona generators for producing ozone in large quantities. Assuming that the length of the air gap is at optimum according to the teachings of the present invention as will be discussed hereinafter, it can be seen that at an applied voltage of fifteen thousand volts, the useful corona power per square inch of generating area is approximately 0.09 watts. In contrast, by utilizing a thin dielectric coating of 5 mils, for example, in accordance with the principles of the present invention, the useful corona power approximates 1.8 watts per square inch of generating area.

A thin dielectric also has the advantage of permitting a larger optimum air gap, and thus providing a greater space for the passage of air oxygen through the corona while at the same time obtaining maximum corona power. For example, with reference to FIG. 9, the dashed line represents a conventional dielectric similar to the one described in connection with FIG. 8. At 15000 applied volts, an air gap of approximately 65 mils is optimum. While, a thin dielectric coating, such as 5 mils, for example, the optimum air gap is in excess of 75 mils. In practical applications, it has been found that a very slight increase in length of air gap (such as one per cent) from optimum, reduces some of the corona losses, and increases slightly the ozone output.

Figure 10:
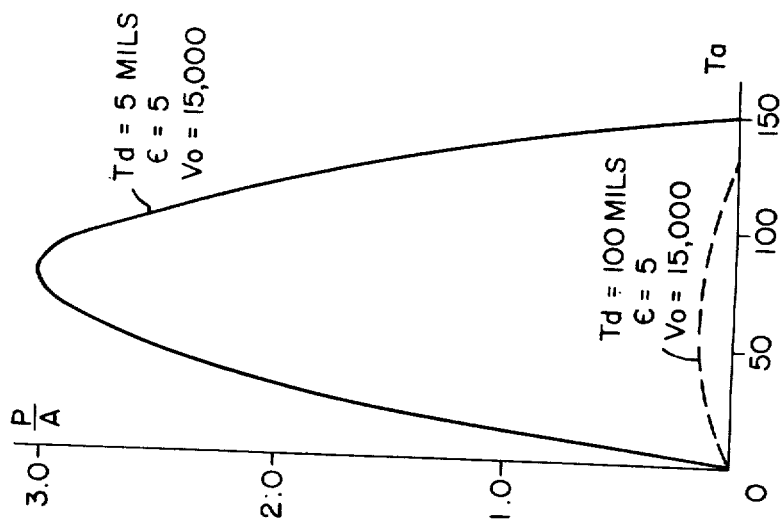
FIG. 10 is a graphical illustration of the useful corona power in watts per square inch as a function of dielectric thickness and air gap according to the principles of the present invention.

FIG. 10 illustrates the importance of the optimum air gap when utilizing a thin dielectric coating according to the present invention. A conventional hundred mil thick dielectric has an applied voltage of approximately 15,000 volts for example, has a broad optimum air gap and therefore is not as critical for maximum useful corona power. However, for a thin five mil dielectric at the same applied voltage, an air gap that is as little as 20 to 25 mils in error will reduce the useful corona power as much as one-third or more.

Also, the lower the applied voltage the less is the optimum air gap; so that an applied voltage of 35 hundred peak, it is advantageous to use as a screen such as shown in FIG. 3 adjacent to and in intimate contact with the coated dielectric because the slight curvature of the screen permits a percentage of its surface to always be at optimum air gap. For small amounts of ozone, the deposited or painted-on conductor may be used as shown in FIG. 2.

A thin dielectric coating of 5 mils having a relative dielectric constant of five requires a minimum of approximately 100 volts to produce a corona. For a dielectric of similar thickness with a substantially greater dielectric constant, such as 100, for example, a corona start voltage in the order of approximately 20 volts peak is required. Thus, the higher the relative dielectric constant of the dielectric material, the greater the ozone output per unit of dielectric area for a given voltage and dielectric thickness.

In all electrical devices there are certain losses in the form of heat and light, etc.; and in ozone generators, more or less efficiency, dpending on atmospheric pressure and temperature. Therefore, in the graphical illustration of FIG. 11, it is assumed that under normal atmospheric conditions, the actual ozone output per day represents a low level of efficiency as it relates to the useful corona power generated per unit of dielectric area. Thus, according to the method of the present invention, assuming such a low level of efficiency, the production of 1 pound of ozone per day requires a dielectric generating area of 40 square inches when air or oxygen is passed through an optimum air gap, one wall of which is a dielectric five mils thick with a dielectric constant of 5 and a voltage of 15,000 peak volts is applied across the electrodes. In contrast, assuming the same degree of efficiency, a conventional thick dielectric of 100 mils requires 900 square inches to produce 1 pound of ozone per day. In producing huge quantities of ozone such as 1,000 pounds per day, a thin dielectric of 5 mils requires 40,000 square inches, and a dielectric of 100 mils requires 900,000 square inches.

As heretofore described, the thinner the dielectric for a given dielectric constant and voltage, the greater the useful corona power, and thus the greater the ozone output per unit of dielectric area. The utilization of a thin dielectric and voltage adjustment is advantageous in applications where it is desirable to have a large variation or adjustable range between the minimum and maximum ozone output per unit of dielectric area, such as in odor control applications, where the degree of odor varies widely, for example, Thus, to obtain substantial benefits from the teaching of the present invention, the thinnest dielectric feasible should be used. In those applications utilizing optimum air gap according to the present teachings, substantial advantages are realized when the dielectric is less than 40 mils. In other applications, it is considered that the greatest quantitative advantage is obtained, when a dielectric having a thinness of less than 20 mils is used. The expression $\epsilon/Td$ (with $T_d$ in mils) is preferably greater than 0.10.

In one practical embodiment of the invention, a tubular decarbonized steel conductor having a fired-on porcelain enamel coating in the order of five mils with a screen conductor in intimate contact therewith was operated over 4,000 consecutive hours at 3,500 peak volts without failure or tendency to arc.

In another practical embodiment utilizing decarbonized flat steel plates having a fired-on porcelain enamel coating 6 mils thick on one plate and 12 mils thick on the other plate spaced therefrom at optimum air gap and an applied voltage of 7,500 peak voltage produced ozone at the rate of 3 pounds per day per square foot of dielectric generating area.

A thin, fired-on porcelain enamel coating with a minimum thinness of 4 to 5 mils is practical because it is inexpensive to manufacture using conventional techniques of firing. It is understood that a thin fired-on glass coating or ceramic piece may be used to the same advantage, or any other thin dielectric, having a softening point temperature as high as glass or above. Because of the low softening point temperature, plastics puncture after limited use.

Although fired-on porcelain enamel has a dielectric constant of from 5 to 10, it has the advantage of being inexpensive in thin coatings as hereinabove described. However, according to the teachings of this invention, the higher the dielectric constant, the greater the useful corona power per unit of area for a given dielectric thickness and applied voltage.

THE CORONA REACTOR 110

Figure 12:
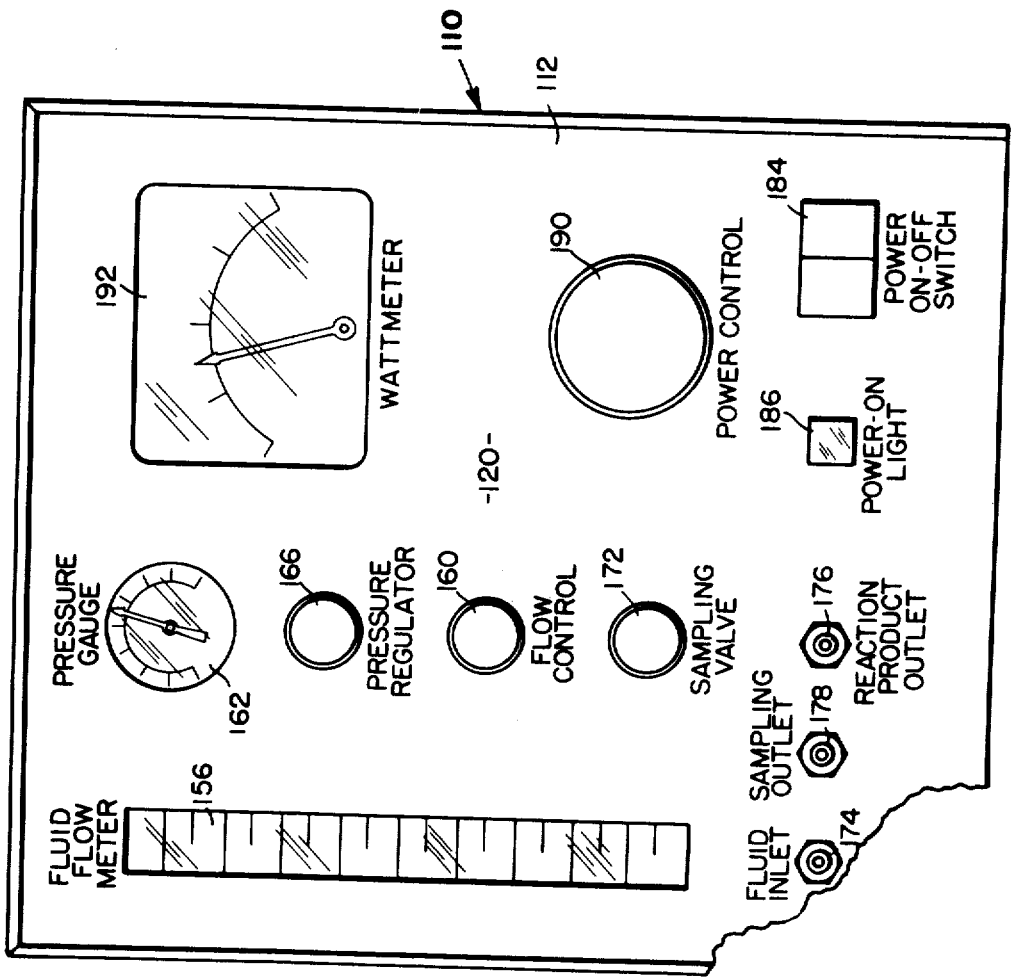
FIG. 12 is a front elevation of the corona reactor 10 showing the control panel 20 thereof.
Figure 11:
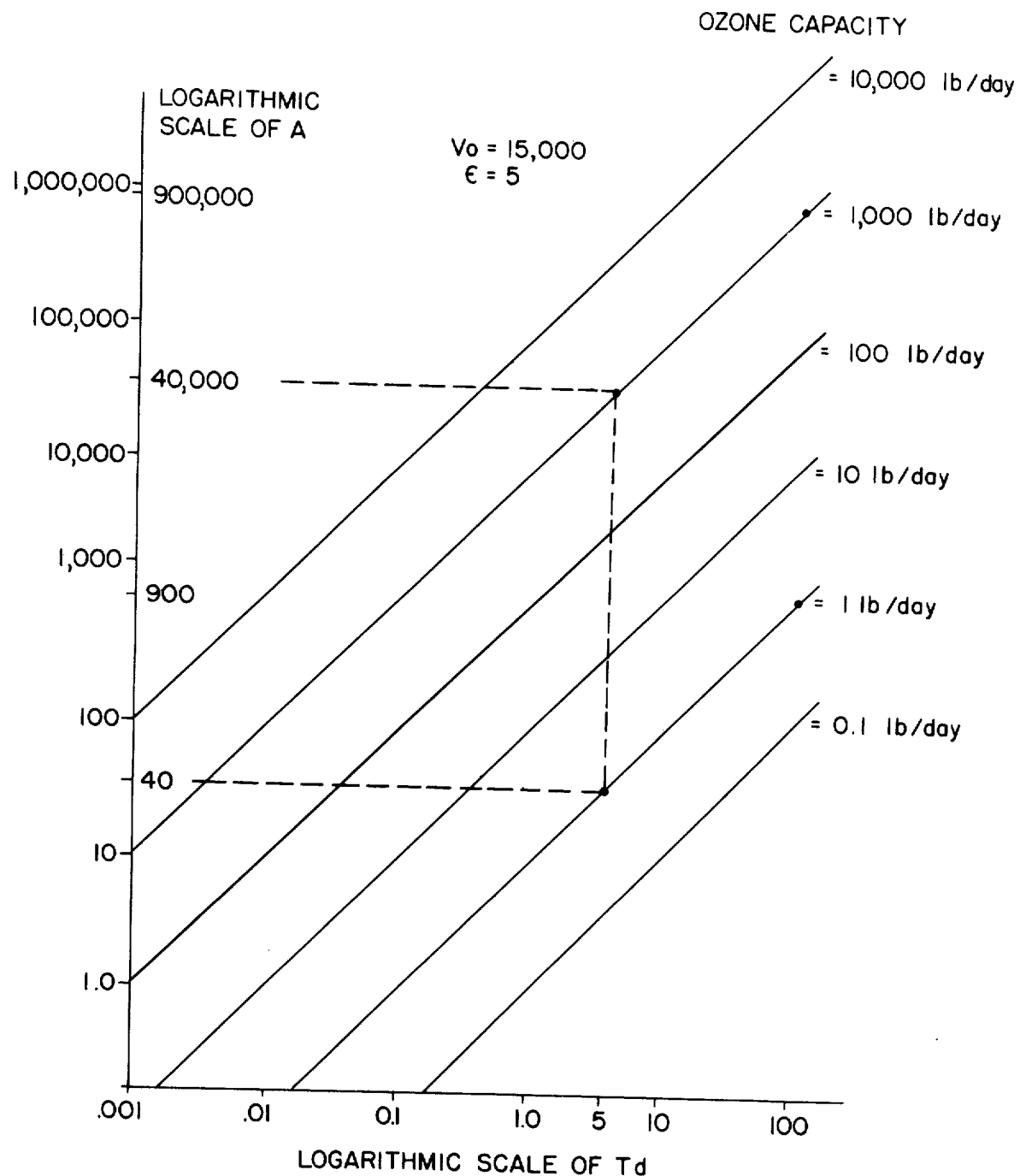
FIG. 11 is a graphical illustration of the advantages of the present invention, showing the approximate amount of ozone per day that can be generated with dielectrics of various thicknesses.
Figure 13:
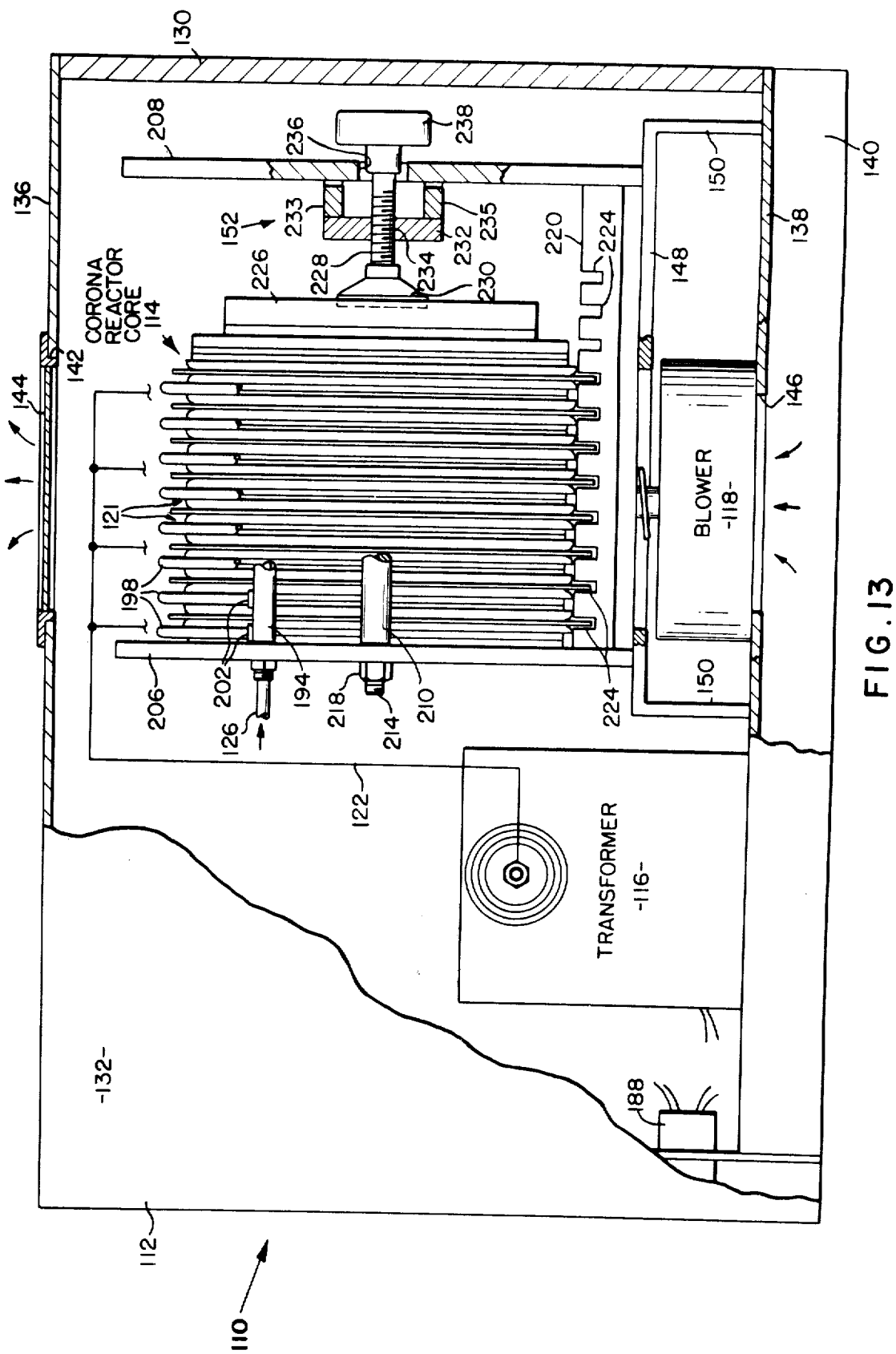
FIG. 13 is a partly broken-away side view of the corona reactor 10 of FIG. 12.
Figure 14:
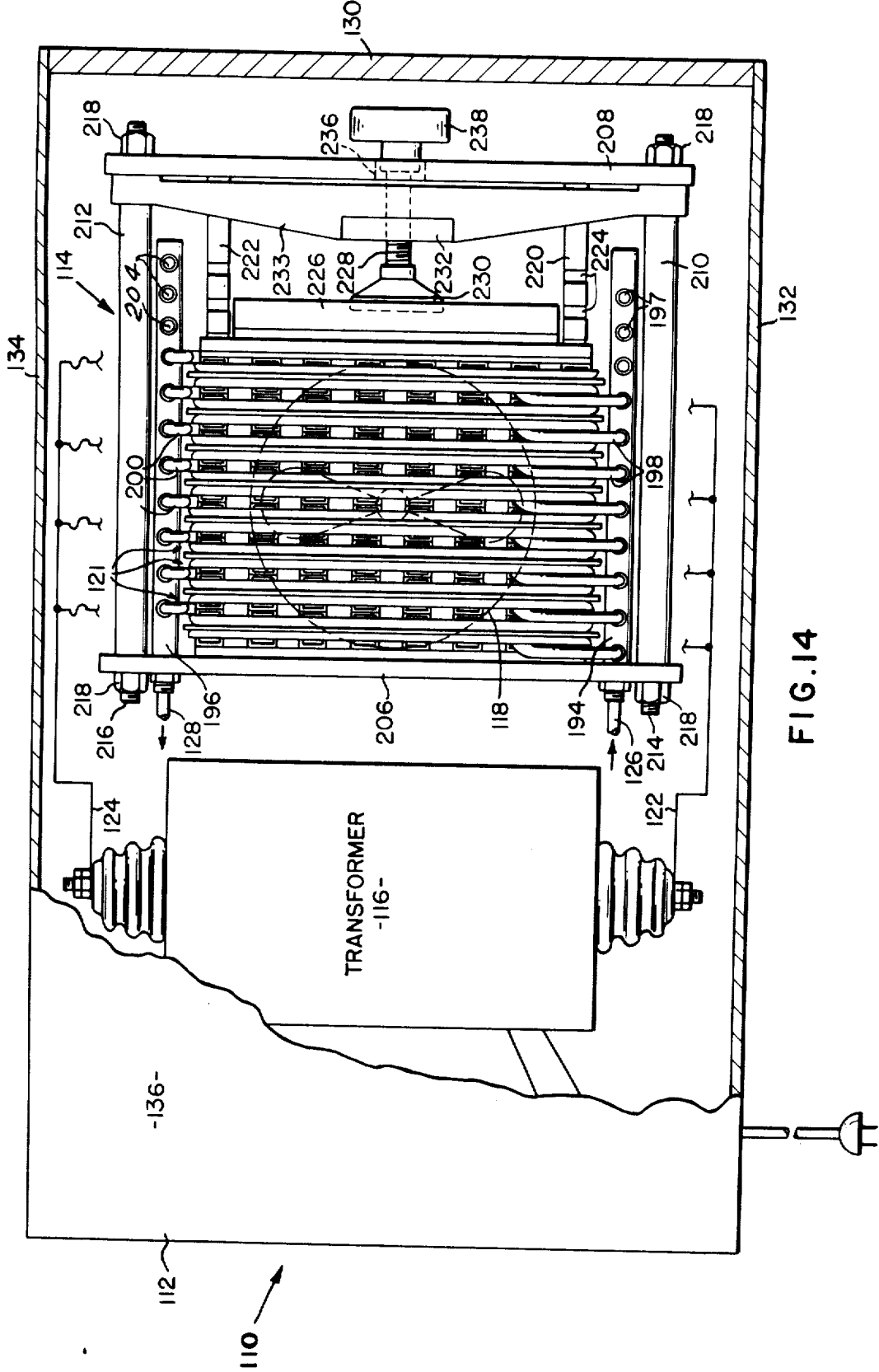
FIG. 14 is a partly broken-away plan view of the corona reactor 10 of FIG. 12.

Referring to FIGS. 12–17 for a description of the over-all arrangement of parts of the present invention, FIGS. 12–14 show a corona reactor 110 of the present invention comprising: a housing 112 containing a corona reactor core 114, a transformer 116, a blower 118, and having a front control panel 120. The corona reactor core 114 is made up of a plurality of individual, separately removable, air-tight corona reactor cells 121.

The heart of the corona reactor 110 is in the corona reactor core 114 and corona reactor cells 121, described in detail below under the heading "The Corona Reactor Core" and "The Corona Reactor Cell" respectively. For the present, it will be sufficient to state that:

1. electric power is supplied to the corona reactor core 114 from the transformer 116 by electrical lead lines 122 and 124;
2. a fluid reactant (when used as an ozone generator, it would be air, oxygen, or an oxygen-containing fluid) is supplied to the corona reactor core 114 from a source through inlet conduit 126;
3. a fluid reaction product is removed from the corona reactor core 114 by an outlet conduit 128; and
4. the corona reactor core 114 is air-cooled by the blower 118.

The Housing 112

The housing 112 comprises the front control panel 120, a rear wall 130, a pair of sidewalls 132 and 134, a cover 136, and a floor 138 spaced above the surface upon which the corona reactor 110 is supported by legs 140. The cover 136 is made easily removable, by means of screws (not shown) or other known type of connecting means, to provide a convenient means of access to the interior of the housing 112, especially for the addition and/or removal of individual corona reactor cells 121 to the core 114. The cover includes an air exhaust opening 142, above the corona reactor core 114, covered by a wire screen 144. The floor 138 includes an air inlet opening 146 below the blower 118.

The housing includes a sub-floor 148 spaced by means of legs 150 a sufficient distance above the floor 138 to accomodate the blower 118. The sub-floor 148 supports the corona reactor core 114 including a clamp device 152 (of a quick connect-disconnect type to be described below) for securing the individual corona reactor cells 121 together in a modular arrangement.

The Control Panel 120

Figure 15:
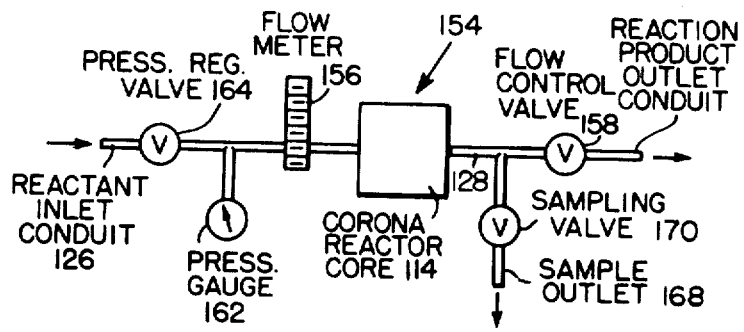
FIG. 15 is a schematic flow diagram for the fluid reactant flow.
Figure 17:
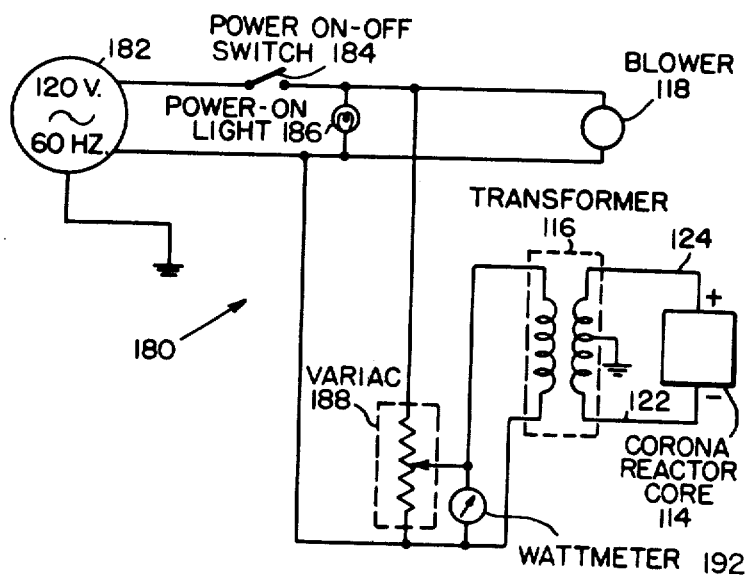
FIG. 17 is an electrical schematic circuit diagram of the power supply of the present invention.

Referring now to FIGS. 12, 15, and 17, a fluid conduit and control system 154 (FIG. 15) includes the inlet and outlet conduits 126 and 128 connected to the individual corona reactor cells 121 of the corona reactor core 114. The flow rate into, through and out of the corona reactor core 114 (see FIGS. 15 and 16) including the conduits 126 and 128, is indicated by a fluid-flow meter 156 on the control panel 120, and is controlled by a flow control valve 158 (FIG. 15) in outlet conduit 128, having a corresponding control knob 160 (FIG. 15) connected thereto and positioned on the control panel 120 and labeled "Flow Control". The fluid-flow meter 156 can be of any standard type, such as those using a vertically movable ball indicating cubic feet per minute of fluid flow.

The pressure of the fluid in the system 154 is indicated by a pressure gauge 162 on the control panel 120 and can be controlled by a pressure regulator valve 164 (FIG. 15) in inlet conduit 126 and having a corresponding pressure control knob 166 (FIG. 12) connected thereto and positioned on the control panel 120 and labeled "Pressure Regulator,"

A convenient feature of the present invention is the provision of a sampling fluid outlet conduit 168 (FIG. 15) connected to outlet conduit 128. A sampling valve 170 (FIG. 15) is connected in sampling outlet conduit 168 and is connected to a corresponding sampling valve control knob 172 (FIG. 12) on the control panel 120 labeled "Sampling Valve".

With reference to FIG. 12, fluid connection can be made to the above-described three fluid conduits 126, 128 and 166 of the fluid conduit system 154 directly on the front panel 120 as follows. An inlet connector 174 positioned on the lower left-hand portion of control panel 120, is connected to the end of inelt conduit 126; an outlet connector 176 on control panel 120 is connected to the end of outlet conduit 128; and a sampling connector 178 is connected to the end of the sampling conduit 168.

Referring now to FIGS. 12 and 17, the electrical power supply circuit 180 of the present invention includes a power source 182 of, for example, 120 volt and 60 Hz, connected to the corona reactor core 114 through the transformer 116. A power ON-OFF switch 184 is connected in the circuit 180 and is positioned on the control panel 120. A power-on light 186 is connected in the circuit 180 and is positioned on the control panel 120 adjacent the switch 184. The light 186 is energized when switch 184 is closed and indicates visually when the power is on. As shown in FIG. 17, the closing of switch 184 also energizes the blower 118.

The power applied to the corona reactor core 114 is controlled by a variac 188 connected to a power control knob 190 located on the control panel 120 and labeled "Power Control". The amount of power supplied to the corona reactor core 114 is indicated by a watt meter 192 located on the control panel 120.

The Corona Reactor Core 114

Referring to FIGS. 13 to 14, the corona reactor core 114 comprises a plurality of individual corona reactor cells 121 held together in the clamp 152. The individual corona reactor cells 121 will be described in detail below with reference to FIGS. 18-20.

The corona reactor core 114 is electrically connected to transformer 116 by means of the pair of electrical lead lines 122 and 124. The various modes of electrically connecting the individual corona reactor cells 121 will be discussed in detail below under the heading "THE ELECTRICAL CIRCUITS."

The fluid connections to the corona reactor core 114 are as follows. The inlet conduit 126 is connected to an inlet manifold 194 (FIGS. 13 and 14) on one side of the corona reactor core 114. The outlet conduit 128 is connected to an outlet manifold 196 (FIG. 14) located on the opposite side of the corona reactor core 114. As will be described in more detail below, each of the corona reactor cells 121 have an inlet tube 198 connected to the inlet manifold 194 and an outlet tube 200 connected to the outlet manifold 196. The tubes 198 and 200 are connected to the manifolds 194 and 196 by means of connectors 202 (FIG. 13), of any known, suitable type. The connectors 202 are preferably of a quick connect disconnect type. Since the number of cells 121 in any core 114 can vary, the inlet and outlet manifolds 194 and 196 respectively may have openings 204 (see FIG. 14) that are not being used. in such case, plugs 197 (FIG. 14) are connected to openings 204 to close them.

Referring to FIGS. 13 and 14, the clamp 152 includes a pair of stationary, vertical end plates 206 and 208 supported on the sub-floor 148 and held a predetermined distance apart by a pair of spacer tubes 210 and 212 and a pair of bols 214 and 216, respectively, passing through the spacer tubes 210 and 212 respectively; the bolts are secured by means of nuts 218. A pair of horizontal support bars 220 and 222 are connected between the vertical end plates 206 and 208. The corona reactor core 114 sits directly on top of the horizontal support bars 220 and 222 (a spacer gasket 262, of each of the individual cells 121 extends into vertical slots 224 (FIG. 13) in each of the horizontal support bars 220 and 222 respectively).

The individual corona reactor cells 121 are vertically oriented and are horizontally stacked or pressed together by means of clamp 152 and are easily and separately removable from the corona reactor 110 by simply removing the cover 136 of the housing 112 and releasing the clamp 152. The individual corona reactor cells 121 are supported on the horizontal support bars 220 and 222 between the end plate 206 and a horizontally movable, vertical pressure plate 226. Pressure plate 226 is movable toward and away from the corona reactor core 114 by means of an externally screw-threaded shaft 228 (rotatably connected at a joint 230 to the pressure plate 226 and connected in screw-threaded relationship to end plate 208). A plate 232 connected, by a pair of supports 233 and 235, to end plate 208, is provided with a central, internally screw-threaded opening 234 in which the shaft 228 is matingly threaded for rotation. The end plate 208 is provided with an opening 236 to accomodate a knob 238 rigidly connected to the shaft 228. The knob 238 is rotated to apply or release pressure on the corona reactor core 114 through the pressure plate 226. The knob 238 is manually accessible when the cover 136 is off.

THE INDIVIDUAL CORONA REACTOR CELLS 121

Figure 18:
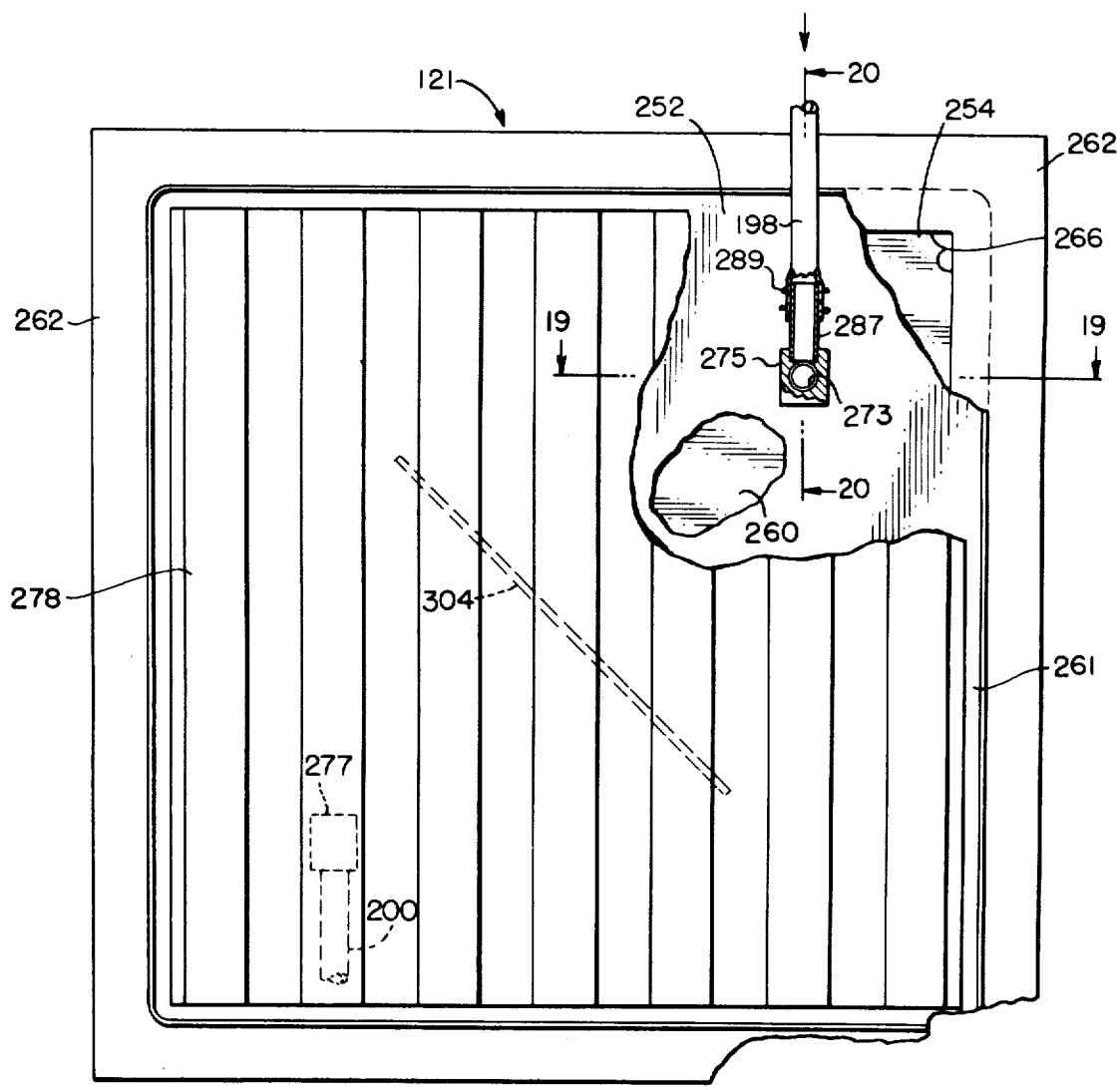
FIG. 18 is a front, plan view partly broken-away, of one embodiment of a corona reactor cell of the present invention.
Figure 19:
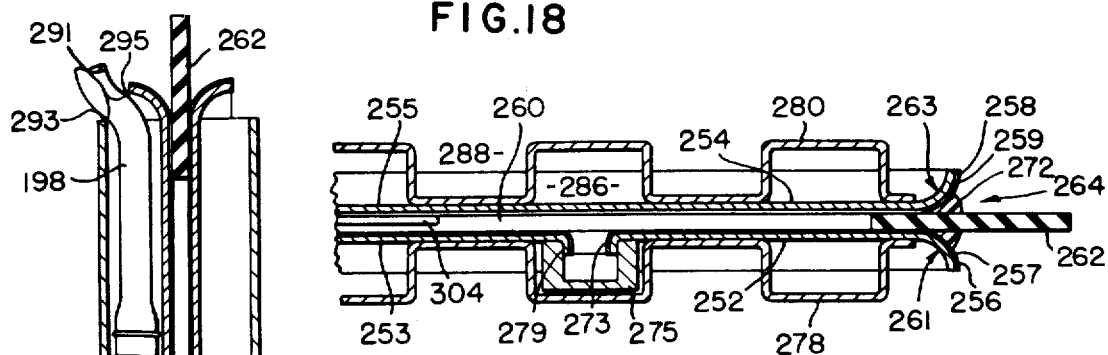
FIG. 19 is an enlarged, partial, horizontal, cross-sectional view through the corona reactor cell of FIG. 18 taken along the line 19—19 of FIG. 18.
Figure 20:
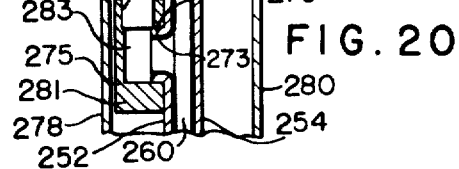
FIG. 20 is a vertical, partial, cross-sectional view through the corona reactor cell of FIG. 18, taken along the line 20—20 of FIG. 18.

FIGS. 18–20 illustrate a corona reactor cell 121 comprising a pair of parallel, uniformly spaced-apart electrodes 252 and 254, each having a bore exterior surface 253 and 255, respectively, exposed to ambient. The electrodes have a dielectric coating 256 and 258, respectively, on the interior surfaces 257 and 259 respectively, of the plates 252 and 254. The spaced-apart electrodes 252 and 254 define a coron reaction chamber 260 threbetween. The electrodes 252 and 254 are preferably decarbonized steel and the dielectric coating is a high softening temperature dielectric, preferably a thin layer of porcelain dielectric that is free of voids.

Reference is hereby made to other sections of the present specification for a description of the method and formulas to be used to determine the preferred type and thickness of the dielectric coatings 256 and 258, the width (inter-electrode or gap spacing) of the corona reaction chamber 260, and the applied voltage in the present invention.

The electrodes 252 and 254 are preferably rectangular and have a turned or flared edge 261 and 263, respectively (see FIGS. 18 and 19) around the entire periphery of the electrodes 252 and 254. The turned edges 261 and 263 are curved away from each other (i.e. away from the adjacent edge of the other of the two electrodes), which permits operation of the corona reactor cell 121 at high voltage without edge sparking. This structure results in the periphery of each of the composite corona reactor cells 121 having a groove 264 (FIG. 19) around the entire periphery thereof, which groove 264 provides for the achievement of a good seal or weld 272 around a spacer gasket 262 (to be described in more detail below).

The two electrodes 252 and 254 are maintained a predetermined distance apart by means of an insulating spacer gasket 262 having a central opening 266 (see FIG. 18), and positioned between the electrodes 252 and 254 around the entire peripheral edge of the cell 121. The spacer gasket 262 is preferably made of plate glass with a 10 mil thick silicone rubber gasket on both sides of the spacer gasket 262. The spacer gasket 262 can be made of solid silicone rubber or any other suitable material (not metal).

The corona reaction chamber 260 is maintained air-tight by sealing the electrodes 252 and 254 air-tight to the spacer gasket 262 by means of, for example, a "weld" or bead 272 or silicone sealant (such as that known as RTV) as shown in FIG. 19. The "weld" or bead is formed on both sides of the spacer gasket 262 around the entire periphery of the cell 121. The spacer gasket 262 thus performs the functions of defining the predetermined spacing between the electrodes 252 and 254 and rendering the cell 121 air-tight.

The fluid reactant is introduced into and removed from the corona reaction chamber 260 of the cell 121 as follows. As stated above, each cell 121 is provided with an inlet conduit 198 and an outlet conduit 200. The inlet conduit 198 is connected to an inlet port 272 in electrode 252 by means of a connector 275. The outlet conduit 200 is connected to an outlet port (not shown) in the other electrode 254 by means of a connector 277. Since the connectors 275 and 277 are identical, a description of one is sufficient. The connector 275 is welded or otherwise connected to the exterior surface 255 of electrode 252 at the port 273, which port 273 can include peripheral wall 279 extending in a direction away from the chamber 260. The connector 275 includes a metallic body 281 having a first cylindrical passageway 283 extending partway therethrough and accomodating or receiving the peripheral wall 279 (see Fig. 20). The body 281 of the connector 275 includes a second cylindrical passageway 285 perpendicular to the first passageway 283 and in fluid communication with the first passageway 283. A tube 287, preferably of metal is welded or otherwise connected to the body 281 at passageway 285 and extends beyond the body 281 to provide a convenient means of attaching the inlet conduit 198 to the connector 275. The conduit 198 can be slipped over the tube 287 and secured by means of a length of wire 289 twisted onto the conduit 198. The outlet conduit 200 is preferably constructed in the same manner. Both ports 273 (and not shown) can be in the same electrode if desired.

From the above description, it will be seen that each individual corona reactor cell 121 is its own individual pressure vessel, sealed by the spacer gasket 262 and the silicone seal or weld 272 "puttied" around the entire periphery of the cell 121 on both sides of the spacer gasket 262. Silicone rubber spacer gaskets and silicone sealant are preferably used because a corona or ozone will not degrade the silicone rubber and sealant, and the silicone rubber and sealant will not degrade the ozone.

In addition to the above described basic structure of the individual corona reactor cells 121, such cells 121 preferably include certain additional structure as follows. FIGS. 18–20 show a pair of aluminum heat sink spacers 278 and 280 in contact with the exterior surfaces 255 and 257, respectively, of the electrodes 252 and 254. The heat sink spacer 278 (a description of one is sufficient because they are identical) is formed with a corrugated design having a plurality of oppositely opening, parallel channels including closed channels 286 and open channels 288. The heat sink spacers 278 and 280 have several functions. One function of the heat sink spacers 273 and 280 is to act as a heat sink, to remove the heat generated by the corona reactor cell 121 during the corona reaction period. To aid in this function, it is preferred to blow cool air through the corona reactor core 114 in a direction parallel to the channels 286 and 288. This is accomplished by means of blower 118 (see FIG. 13). Thus, as shown in FIG. 14 the corona reactor cells 121 are arranged such that the channels 286 and 288 are oriented vertically so that air entering the corona reactor 110 from the bottom can be blown vertically up through the corona reactor core 114 and out the opening 142 in the housing 112. Another function of the spacers 278 and 280 is to maintan the adjacent corona reactor cells 121 in spaced-apart relationship, when a plurality of such cells 121 are combined to form a corona reactor core 114, and to carry and uniformly distribute the forces resulting from the pressure of the fluid reactant in the reaction chamber 260. The heat sink spacers 278 and 280 also carry and uniformly distribute the forces of the pressure plate 226 throughout the corona reactor core 114.

Being electrically as well as thermally conductive, the spacers 278 and 280 also provide the additional function of providing an electrical connection between adjacent electrodes of adjacent corona reactor cells 121. The spacers 278 and 280 also provide the additional function of providing an electrical connection between adjacent electrodes of adjacent corona reactor cells 121. The spacers 278 and 280 thus provide convenient electrical terminals to which the electrical power can be applied and for electrically connecting the cells 121 together.

In order to form a corona reactor core 114 containing a plurality of corona reactor cells 121, the cells 121 are placed or stacked one against the other as shown in FIGS. 13 and 14, and the electrical and fluid connections made. Regarding FIG. 13 showing the horizontal support bars 220 and 222 having slots 224 therein, the reason for such slots 224 is now clearly seen, i.e., to provide access room for the spacer gaskets 262.

The conduit 198 carrying the fluid reactant into the reaction chamber 260 extends partway through one of the closed channels 286 of the spacer 278 and extends through the spacer 291 between one edge 293 (FIG. 20) of the spacer 278 and the adjacent edge 295 of the electrode 252. The outlet conduit 200 extends through one of the channels 286 in a similar manner to that just described for the inlet conduit 198.

FIGS. 18–20 show an additional feature of the present invention comprising a silicone baffle 304 to aid in the reaction by preventing the creation of any "dead spaces" in the reaction chamber 260. The baffle 304 is not a complete, imperforate wall extending across the entire width (inter-electrode gap) of the reaction chamber 260, but rather as shown in FIG. 19, merely extends partway across the width of the reaction chamber 260.

Further, to prevent arcing the voltage can be decreased. The same (or even greater) corona intensity can be maintained with a smaller voltage by increasing the frequency, as will be understood by reference to the following equation:

$$P = Kv^2 f$$

where:

K is a function of dielectric thickness, dielectric constant, and width of air gap, in accordance with the teachings set forth in other sections of this specification.

P is the power in watts of the corona discharge;
V is the voltage (in volts) applied across the electrodes 252 and 254; and
f is the frequency in Hz.

Typically, the frequency according to this aspect of the present invention is in the range of about 100 Hz to 6,000 Hz and the voltage is in the range of about 2,000 to 15,000 volts peak.

THE ELECTRICAL CIRCUITS

Reference will now be made to FIGS. 2–23 for a description of three different voltage driving arrangements of the present invention.

Figure 21:
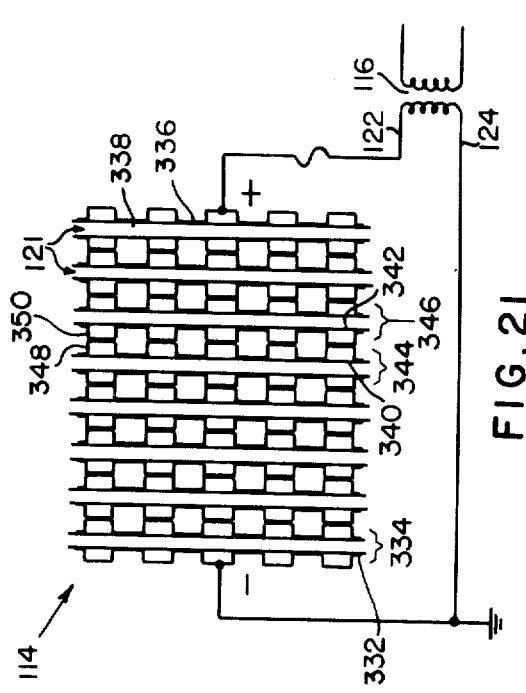
FIG. 21 is an electrical schematic circuit diagram showing the individual corona reactor cells of a corona reactor core connected in series according to the present invention.
Figure 16:
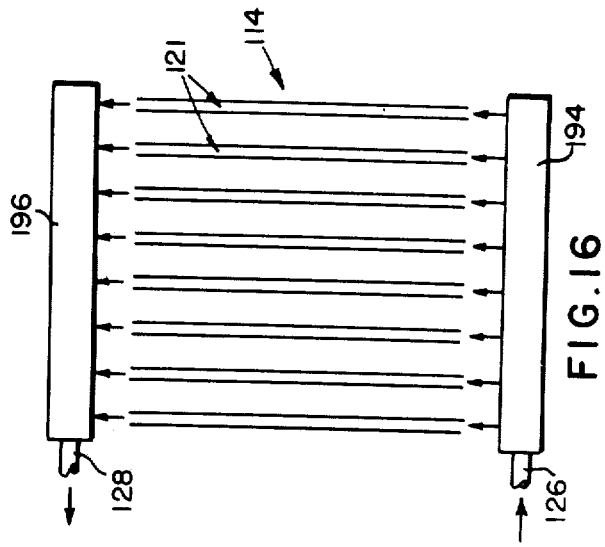
FIG. 16 is a simplified, schematic flow diagram showing the reactant flow into, through, and the reaction product flow out of, the corona reactor core 14 of the present invention.

FIG. 21 shows the series connected voltage driving scheme of the present invention which alleviates the above-described disadvantage in the prior art parallel scheme. As shown in FIG. 21, the transformer 116 has one lead connected to a left-hand outside heat sink spacer 332 of the left-hand outside or end cell 334 and the other electrical lead from the transformer 116 is connected to an outside heat sink spacer 336 of the right-hand outside or end cell 338, at the opposite end of the corona reactor core 114. Adjacent plates, (for example plates 340 anad 342 of different but adjacent corona reactor cells 344 and 346) are all electrically connected together by virtue of a pair of aluminum heat sink spacers 348 and 350, connected thereto.

In this embodiment, the high voltage applied from the transformer 116 across the entire corona reactor core 114 will preferably be of the order of 30,000-60,000 volts depending upon the use to which the corona reactor 110 is put.

It is found that the individual electrodes of the individual cells 121 act as voltage dividers with the voltage division being governed by the same laws as govern the corona discharge. It has actually been demonstrated that, in a stacked (sandwich) array making up a corona reactor core 114, the corona electrode gap of some (or even one) reactor chambers can be twice the distance of that of the remaining reactor chambers, and yet the corona discharge or intensity will be absolutely uniform throughout every reaction chamber. One reaction chamber was even made wedge-shaped in cross-section with virtually no gap on one edge and a full gap on the opposite edge and a preferably uniform corona was found to exist therein, with the series electrical mode of FIG. 21 of the present invention.

It is further noted that as the exciting voltage is increased from 0 volts up to the corona discharge start (voltage) point, all reaction chambers start at exactly the same voltage. This is not true with the conventional parallel mode electrical circuit, where the reactor chamber with the smallest gap lights first, the second smallest lights second, etc. The uniformity of corona produced by the present invention greatly facilitates the ease and economy of manufacture.

Figure 22:
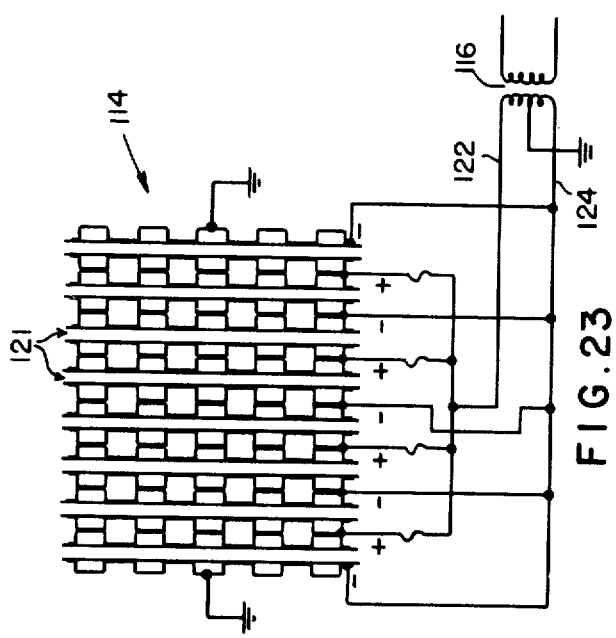
FIG. 22 is an electrical schematic circuit diagram showing the corona reactor cells connected in combination series-parallel.

FIG. 22 shows a combination series and parallel electrical connection wherein a smaller voltage can be employed than is used in the embodiment in FIG. 21 where the voltage is supplied across the entire stack (sandwich) or array of corona reactor cells 121 of the corona reactor core 114. In FIG. 22, one electrical lead 124 from the transformer 116 is connected to the two outside end heat sink spacers 310 and 312 (or the adjacent electrode thereof) of the two outside corona reactor cells 314 and 316, respectively. The other electrical lead 122 from the transformer 116 is applied to the two adjacent electrodes 318 and 320 of the two middle corona reactor cells 322 and 324, respectively, by connecting the lead line 122 from the transformer 116 to the spacers 328 and 330 connected to the electrodes 318 and 320 respectively. The operation of this embodiment of the present invention has characteristics of both the parallel and the series electrical circuits discussed above. The voltage to be applied to a corona reactor unit 114 having eight corona reactor cells, as shown in FIG. 22, will be approximately 20,000 to 50,000 volts peak.

FIG. 23 shows a completely parallel electrical arrangement in which a plurality of corona reactor cells 121 are connected in parallel. As stated above, the heat sink spacers 278 and 280 provide electrical connection between adjacent electrodes of adjacent cells. As shown in FIG. 23, the adjacent electrodes of adjacent cells have the same polarity and are electrically connected together. Electrical connection from the transformer 116 is made directly to the heat sink spacers 278 and 280. This parallel system is the preferred electrical arrangement.

EXAMPLE

The preferred parameters for a typical run using the corona reactor 110 of the present invention to generate ozone are as follows:

The reactant was air.
The pressure in the individual corona reaction chamber was about 10 psi.
The power applied was 400 watts.
The flow rate was 1 CFM.
The number of corona reactor cells in the corona reactor core was 8.
The corona electrode gap (electrode spacing) was 60 mils.
The voltage was 12,000 volts peak for each cell.
The frequency was 60 Hz.
The ozone yield was 1 pound per day.

THE LIQUID-IMMERSED SYSTEM

According to the present invention, the corona reactor cells are completely immersed in a dielectric liquid. The dielectric liquid performs the two functions of cooling the electrodes and of preventing arcing between the electrode edges.

Before describing the liquid-immersed system in detail, a few preliminary comments are in order. It is true that the corona reactor per se used in the present invention includes the advantage of having the capacity to generate large quantities of high concentration ozone, with only forced air cooling and without the cumbersome and very expensive water cooling equipment required in the "heat limited" prior art ozone generators. However, since the corona reactor is not heat limited, as are the prior art commercial ozone generators, the cells of the present invention can go from producing about 3 lb/day/cell of ozone to, for example, about 10 lb/day/cell using about 3–4 gallons/minute/cell of cooling liquid. A liquid can, of course, remove much more heat from the cells than can a gas because of its high density. However, in this system of the invention, the liquid that is used is not the one that is the best for heat transfer, but rather it is, according to the present invention, a dielectric liquid. The use of a dielectric liquid for the coolant provides the additional advantage that it can also prevent arcing between the two electrode edges of each cell. This function allows the cell to be produced in a less expensive manner than heretofore possible (when other means for preventing arcing had to be employed).

Referring now to FIGS. 24 and 25 of the drawings, the liquid-immersed system of the invention comprising a liquid-tight housing 410 preferably made of stainless steel, a corona reactor core 412 mounted (by any suitable mounting means) in a core chamber 414 in the housing 410, a cooler 416, a pump 420, and necessary piping 422. This system also includes an inlet conduit 426 for an oxygen-containing gas and an outlet conduit 428 for ozone-containing gas. A suitable electrical cable 430 extends through the housing 410 and provides the necessary electrical connections with the electrodes 432 and 434 (see FIG. 25) of the individual cells 436 of the core 412.

The cooler 416 can be any suitable heat-exchanger such as, for example, one similar to a car radiator (preferably with a fan). The pump 420 can be any suitable pump and need not be described in detail here.

The core 412 is preferably in the nature of two modules 440 and 442, each containing a plurality of cells arranged alternately with spacers 278 in the manner shown in FIGS. 13 and 14, for example. For simplicity of disclosure of this dielectric liquid-immersed invention, FIG. 24 does not show, for example, all the details of the spacers 273 between each cell 436, since such details are fully shown and described above. Baffles (not shown) can be located in the chamber 414 so as to direct the flow of cooling, dielectric liquid through the channels 286 and 288 in the spacers 278 (see FIGS. 14 and 19, for example). The gas connections to the individual cells 436 can be basically as described above with respect to FIG. 14. The inlet conduit 426 is connected to an inlet manifold 194 and the outlet conduit 428 is connected to an outlet manifold 196. Each of the corona reactor cells 436 has an inlet tube 198 and an outlet tube 200 connected to the inlet and outlet manifolds 194 and 196, respectively, as described above (see FIG. 14).

Referring to FIG. 25, the cells 436 are identical to the air-cooled cells 121 described above except that the glass/silicon rubber picture frame (or gasket) of the air-cooled cell that serves both as a gasket and a gap setter is replaced, in the oil-immersed cell, by a one-piece fluorosilicon rubber picture frame (or gasket) 444. The glass is not needed to tame the edge sparking since the transformer oil 446 (or liquid silicon dielectric compound) serves this purpose. Fluorosilicon rather than silicon rubber is used because of its superior resistance to transformer oil; other materials can be used for the gasket 444.

The preferred dielectric liquid is transformer oil, having a dielectric constant of about 3. Any other available dielectric liquid can be used, such as liquid silicon dielectric material.

CENTER SUPPORT

With reference to FIG. 25, another feature of this invention is the use of a center support disc 450. This support disc 450 is preferably of fluorosilicon rubber in the oil-immersed cell, and is preferably a glass disc with a silicon rubber gasket on each surface in the air-cooled cell. In either case, it should have the same thickness as that of the gasket or picture frame. The spacer disc 450 is preferably positioned in the center of the corona reaction chamber 260 and is preferably a right circular cylinder. The disc 450 preferably has a diameter of about three-fourths inch, in a cell having an area of about 50 square inches. With the addition of this disc, the same cell 436 unexpectedly achieves significantly more ozone production using the same power, probably due primarily to more smooth, laminar, or uniform air flow through the chamber without ripples, eddy currents or other flow disturbances. The disc 450 also helps to maintain the electrodes 432 and 434 parallel when the chamber pressure is less than that external to the chambers. The disc can have other shapes, can be larger or smaller, and more than one disc can be employed. The disc preferably takes up about 1/100 of the chamber volume, but can take up from 1/30 – 1/200 of the chamber volume.

It is to be understood that the above description of the present invention has been made with reference to the preferred embodiments thereof and that the present invention is not limited thereto. For example, it is within the scope of certain aspects of this invention to use a plurality of tubes or other geometric shapes in place of the electrodes shown in the drawings, and such tubes and other shapes can also be stacked or sandwiched together in a modular array, for easy individual removal and insertion. Such tubes and other shapes can be connected in the series mode of the present invention. Further, other materials can be used than those specifically set forth above. Although the preferred use of the present invention is in the generation of ozone, it is to be understood that other reactants can be introduced into the corona reactor core 114 and subjected to a corona reaction to produce various reaction products as is known in the art.

Further, it is not necessary for each of the electrodes 252 and 254 to have a dielectric coating; one electrode can have a dielectric coating and the other electrode can be bare metal but with some sacrifice in ozone yield.

THE PREFERRED PORCELAIN ENAMEL

As defined by the American Society For Testing & Materials, porcelain enamel is "a substantially vitreous or glassy, inorganic coating bonded to metal by fusion at a temperature above 800° F.". Porcelain enamel is a form of glass in which the main ingredients are silica, borax and soda, i.e., a boro-silicate glass. Other ingredients are added to modify the properties to obtain the desired expansion, fluidity, adherence, hardness, etc.

The batch of raw materials is melted in a special furnace called a smelter at a controlled time and temperature. It is then quenched by pouring the molten glass, which is at about 2,200° F., through water-cooled rollers. The sudden chilling forms flakes of solid glass which is called Frit. The resulting properties of the frit are as much a result of the smelting techniques as they are of the formulation of raw materials. Two companies smelting the same formula would not necessarily obtain identical frits.

The frit is the basic ingredient of a porcelain enamel. But to apply the enamel, the frit must be ground fine. Water is used as the vehicle and clay and salts are added to keep the frit particles in suspension and give it sufficient viscosity or set. The mixture is ground in a ball mill and all the additions other than the frit are referred to as mill additions. These additions within limits also tend to modify the properties of the enamel.

For use with the high dielectric strength porcelain enamel coating of the present invention the electrode on which it is coated is preferably de-carburized steel as the base metal, this is a special steel with extremely low carbon produced specifically for porcelain enamelling. It is less susceptible to enamelling defects than conventional enamelling steel. The metal is prepared by conventional enamelling procedures including cleaning in a hot commercial soak cleaner and thorough rinsing and then etching in a 6% by weight solution of sulphuric acid at 160° F. for about 8 minutes. Following another rinse the electrode is immersed in a solution of nickel sulphate for about 10 minutes. The strength of the solution is 1 ounce per gallon and the p.H. is controlled to between 3 and 4. After the nickel bath the electrode is neutralized and dried.

Then the procelain enamel coating of the present invention is applied by first applying a ground coat to at least one of the electrodes and then applying a cover coat.

The ground coat is applied by spraying to a fired thickness of 2.5 mils. The ground coat composition is:

90 parts 10310 frit (Chicago Vitreous)
10 parts 2927 frit (Penco)
3 parts Syloid 255 (W.R. Grace Co.) (synthetic colloidal silica)
50 parts water The approximate composition of the 2927 frit is:

| | | |
|---|---|---|
| Silica | 40% | |
| Boric Oxide | 20% | |
| Alkali | 25% | (Sodium & potassium oxide) |
| Alumina | 3% | |
| Cobalt, manganese and nickel oxide | 4% | |
| Calcium fluoride | 6% | |
| Calcium, magnesium and copper oxide | 2% | |
| | 100% | |

The approximate composition of the 10310 frit is:

| | | |
|---|---|---|
| Silica | 65% | |
| Boric oxide | 10% | |
| Alkalais | 11% | (Sodium & Potassium oxide) |
| Alumina | 3% | |
| Cobalt, manganese and nickel oxide | 4% | |
| Calcium and magnesium oxide | 7% | |
| | 100% | |

It is ground in a ball mill to less than 1% by weight retained on a 325 mesh screen. It is noted that normal fineness for groundcoats is 1 to 15% retained on a 200 mesh screen.

This frit combination is very effective in suppressing iron oxide penetration into the coating while being fluid enough to permit the molten enamel to flow into a smooth dense coating. Conventional ground coats all contain clay and various soluble salts to suspend the particles in water and which also produce a considerable amount of gas bubbles in the fired coating. The ground coat of the present invention is virtually bubble free.

The sprayed parts are dried to eliminate the water and then fired at 1,480° F. for 3¾ minutes.

Then a cover coat is sprayed on to the ground coat to obtain an additional fired thickness of about 4½ mils.

The cover coat has the following composition:

| | | |
|---|---|---|
| 100 | parts | 14890 Frit (Chicago Vitreous) |
| 4 | parts | Syloid 255 |
| ½ | part | Titanium dioxide |
| ¼ | part | Zinc oxide |
| ¼ | part | Barium chloride |
| ½ | part | Lithium silicate |
| 45 | parts | Water |

For 14890

| | |
|---|---|
| Silica | 35% |
| Boric oxide | 18% |
| Alkalais | 17% |
| Titanium Dioxide | 22% |
| Alumina | 1% |
| Fluorine | 5% |
| Phosphorous pentoxide | 2% |
| | 100% |

This is ground in a ball mill to a fineness of one half of one per cent retained weight on a 325 mesh screen. Conventional enamels are ground to 1/2% on 200 mesh.

This frit has a high titania content and is very fluid at the firing temperature. Conventional enamels have clay and various soluble salts for suspension of the frit particles in water. We have eliminated all gas producing ingredients and the barium chloride tends to suppress the formation of bubbles in the coating.

The white coat is fired at 1,420° F. for 3¾ minutes. Additional coats can be applied the same way. The resulting coating has a dielectric strength of 1000 volts or more/mil. of thickness and a dielectric constant of about 5.5.

Referring to FIGS. 18–20, for example, the presently preferred construction employs the above described ground coat and cover coat on electrode 152, and employs the ground coat and two separately applied cover coats on electrode 154, for a total dielectric thickness of about 18 mils. The second cover coat is fired at the same temperature and for the same time as the first cover coat.

While the ground coat does not have as high a dielectric strength as does the cover (or white) coat, it is preferred to use a ground coat underneath the cover coat because it has the property of absorbing metal oxides from the metal substrate and such absorption renders the metal oxdies (which are otherwise semi-conductive) non-conductive. The cover coat does not have this function, and if the cover coats were applied without a ground coat there would be more failures of the coating.

The total thickness on each electrode is preferably less than 20 mils, because above this thickness there is a greater chance of the coating cracking or flaking off of the metal.

While the above specified composition is preferred, other porcelain enamel dielectric materials can be used as will be understood by one skilled in the art after reading the present specification. The highest possible dielectric constant material is employed; porcelain enamel dielectric materials have dielectric constants ranging from about 2.5 to 10.

According to a preferred embodiment of the present invention, in addition to eliminating all gas producing ingredients from the composition, we also prefer to eliminate all conductive particles from the composition to prevent them from possibly causing the dielectric layer to break down at that point and produce a void in the final thin dielectric coating when the voltage is applied across it. One preferred method of eliminating such conductive particles is by magnetically separating any such particles out using any suitable known magnetic separating system. In addition, conductive contaminant particles are kept from ever getting into the composition during its manufacture and use by maintaining all surfaces extremely clean and by scrubbing them down prior to use. The use of several separate layers has the advantage in that although a few imperfections may exist in the porcelain enamel dielectric material, that if one does exist in a first layer, it is almost assured that there will not exist another imperfection in a second adjacent layer at a position exactly overlying the imperfection in the first layer. And an imperfection in one layer will usually not result in a breakdown of the entire layer, unless it happens to be "in-line" or in registry with another imperfection in the adjacent layer. Where three layers are used, the chances of the porcelain enamel dielectric coating breaking down at a particular point due to imperfections in the layers, are even more remote.

The invention has been described in detail with particular reference to the preferred embodiments thereof, but it will be understood that variations and modifications can be effected within the spirit and scope of the invention as described hereinabove and as defined in the appended claims.

I claim:

1. A dielectric liquid-immersed corona generator comprising:
   a. a fluid-tight housing;
   b. a heat exchanger;
   c. means for pumping a dielectric liquid from said housing to said heat exchanger and back to said housing;
   d. a corona generator positioned within said housing and including a plurality of gas-tight corona generating cells, each cell comprising a pair of flat, solid, spaced-apart electrodes forming a corona discharge chamber between inner facing surfaces of said electrodes, a layer of dielectric material coated on the inner surface of each of said electrodes, a gasket positioned between said pair of electrodes adjacent the peripheries thereof and defining, along with said inner facing surfaces of said pair of electrodes, said corona discharge chamber therewithin, said gasket also determining the thickness of said corona discharge chamber and a spacer element positioned between each adjacent pair of cells and in contact with the external surface of the adjacent electrodes of the adjacent cells, said spacer elements including gas passageways therethrough, and including means for holding said cells and said spacer elements together;
   e. a gas inlet and a gas outlet conduit extending through said housing and into gas communication with the corona discharge chamber of each of said cells for feeding oxygen-containing gas into the ozone-containing gas from, said chambers;
   f. means including a solid electrical conductor connected to said electrodes for applying a voltage across the electrodes of each of said cells, and
   g. a disc centrally located in each of said discharge chambers and having a thickness substantially equal to that of said gasket for maintaining said electrodes flat and providing a more uniform air flow through said chamber.

2. The apparatus according to claim 1 wherein each of said discs includes two flat surfaces, each of which flat surfaces is in contact with a respective one of the inner facing surfaces of said pair of electrodes of each cell.

3. The apparatus according to claim 2 wherein said disc takes up approximately 1/100 of the volume of said chamber.

4. The apparatus according to claim 2 wherein said disc is made of the same material as that of said gasket.

5. A corona reactor core including a plurality of adjacent corona reactor cells each comprising a pair of flat, parallel, spaced-apart, dielectric-coated, electrodes, and means defining an airtight corona discharge chamber therebetween, means in contact with the external surface of each electrode for maintaining said electrodes flat and parallel at chamber pressures higher than ambient, and means located inside of said chamber and in contact with the internal surface of each electrode for maintaining said electrodes flat at chamber pressures lower than ambient.

6. The apparatus according to claim 5 wherein each electrode has an internal dielectric-coated surface and an external heat exchange surface.

7. The apparatus according to claim 6 wherein said electrodes are relatively thin and are deflectable under chamber pressures higher than ambient, including a spacer element positioned between each adjacent pair of cells and in contact with the external surface of the adjacent electrodes of the adjacent cells, said spacer elements including gas passageways therethrough, and including means for holding said cells and said spacer elements together.

8. The apparatus according to claim 7 wherein said spacer elements are electrically conductive and provide electrical connection between said adjacent electrodes of said adjacent cells.

9. The apparatus according to claim 5 wherein said means for maintaining said electrodes flat at chamber pressures lower than ambient comprises a flat element substantially centrally located in said chamber and extending from one electrode to the other.

10. The apparatus according to claim 9 wherein said element is a right circular cylinder.

11. The apparatus according to claim 10 wherein said element takes up between about 1/30 – 1/200 of the volume of said chamber.

12. The apparatus according to claim 11 including a flat, one-piece gasket located between internal facing surfaces of said electrodes adjacent their peripheries and wherein said element has the same thickness and is formed of the same material as that of said gasket.

13. A corona reactor core including a plurality of adjacent corona reactor cells each comprising a pair of flat, parallel, spaced-apart, dielectric-coated, electrodes, and means defining an airtight corona discharge chamber therebetween, means for feeding a fluid into and out of said chamber, and means positioned in said chamber for making the fluid flow through said chamber smooth, laminar, and uniform.

14. The apparatus according to claim 13 wherein said electrodes are rectangular, wherein said feeding means includes spaced-apart, separate, inlet and outlet openings through at least one of said electrodes, and wherein said means comprises a single, right circular cylindrical element, centrally positioned in said chamber and extending between and in contact with both of said electrodes.

15. The apparatus according to claim 14 wherein said openings are on opposite sides of said element and wherein said means takes up between about 1/30 – 1/200 of the volume of said chamber.

16. A method for preventing electrical discharge between the adjacent peripheries of a pair of spaced-apart electrodes of an airtight corona generating cell, said electrodes including internal surfaces defining a corona generating chamber and external heat exchange surfaces, said method comprising immersing said cell in a dielectric liquid and surrounding said peripheries with said dielectric liquid, cooling said liquid whereby said liquid serves to simultaneously prevent said discharge and to cool said cell, providing a plurality of said cells in a housing, filling said housing with said dielectric liquid, and circulating said dielectric liquid from said housing to a cooler and back to said housing, said electrodes being flat and parallel and providing a stack of said cells spaced apart by spacer means contacting said external surfaces and providing liquid coolant passageways through said spacers, providing a gasket of fluorosilicon rubber material between each pair of electrodes of each cell adjacent the peripheries of said electrodes for setting the distance therebetween, and maintaining said electrodes flat by providing a disc centrally located between each pair of electrodes of each cell and having a thickness substantially equal to the thickness of each of said gaskets.

* * * * *